(12) United States Patent
Sundaram et al.

(10) Patent No.: US 10,757,608 B2
(45) Date of Patent: Aug. 25, 2020

(54) SYSTEMS AND METHODS FOR DYNAMICALLY ADJUSTING SCAN ALGORITHMS

(71) Applicant: Zebra Technologies Corporation, Lincolnshire, IL (US)

(72) Inventors: Sundaresan Sundaram, Bangalore (IN); Keerthana Kalyanasundaram, Bangalore (IN); Sateesh V. Angadi, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/136,754

(22) Filed: Sep. 20, 2018

(65) Prior Publication Data

US 2020/0100144 A1   Mar. 26, 2020

(51) Int. Cl.
| | |
|---|---|
| *H04W 28/22* | (2009.01) |
| *H04W 28/24* | (2009.01) |
| *H04W 28/02* | (2009.01) |
| *H04W 24/10* | (2009.01) |
| *H04W 72/08* | (2009.01) |

(Continued)

(52) U.S. Cl.
CPC ........... *H04W 28/22* (2013.01); *H04W 24/10* (2013.01); *H04W 28/0268* (2013.01); *H04W 28/24* (2013.01); *H04W 36/30* (2013.01); *H04W 72/085* (2013.01); *H04W 76/27* (2018.02)

(58) Field of Classification Search
CPC ..... H04W 28/22; H04W 76/27; H04W 24/10; H04W 28/0268; H04W 28/24; H04W 36/30; H04W 72/085; H04W 48/16; H04W 72/10; H04W 74/0816; H04W 16/14; H04W 88/08; H04W 84/12; H04W 48/12; H04W 48/10; H04W 52/40; H04W 24/04; H04W 74/08; H04W 74/0808; H04W 72/044; H04W 72/04; H04W 72/0453; G01S 7/40; G01S 7/02; G01S 7/023; G01S 7/021; H04L 61/6022; H04L 12/26; H04L 43/065; H04L 43/0882; H04L 47/12; H04L 47/245; H04L 47/29; H04L 47/323; H04L 41/0659; H04L 45/22; H04L 45/28; H04L 29/12; H04B 7/0413; H04B 1/38; H04B 3/32; H04B 3/487; H04B 7/005; H04M 11/062; H04Q 7/34

See application file for complete search history.

(56) References Cited

U.S. PATENT DOCUMENTS

2004/0235525 A1* 11/2004 Chater-Lea ........... H04W 24/04
                                                       455/561
2017/0325158 A1* 11/2017 Phogat ................ H04L 61/6022

* cited by examiner

*Primary Examiner* — Hardikkumar D Patel

(57) ABSTRACT

A method for dynamically adjusting a scan pattern and electronic device to perform the same. The method includes obtaining a data packet of a communication session on a first communication channel. The method further includes analyzing the data packet to determine a priority associated with the communication session and determining that the priority associated with the communication session exceeds a threshold. In response to the determination, the method includes adjusting one or more parameters of a scan algorithm implemented by a wireless driver. The method further includes determining that a signal quality for the first communication channel is below the threshold quality level and executing the scan algorithm in accordance with the adjusted one or more parameters.

23 Claims, 5 Drawing Sheets

(51) Int. Cl.
*H04W 36/30* (2009.01)
*H04W 76/27* (2018.01)

SYSTEMS AND METHODS FOR DYNAMICALLY ADJUSTING SCAN ALGORITHMS

BACKGROUND OF THE INVENTION

Many mobile devices support communication services, such as voice of internet protocol (VOIP) or streaming media. When a mobile device is engaged in an active communication session, the network conditions change. For example, the user of the mobile device may move locations. If the network conditions for the active channel degrades, the mobile device initiates a scan to locate a new channel to support the communication session.

However, scanning the new channel requires the mobile device to tune to channels not associated with the active communication session. As a result, during the scan period, the performance of the communication session is degraded, such as by the introduction of delay and jitter into the communication session.

Accordingly, there is a need for systems and methods for dynamically adjusting scan algorithms.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
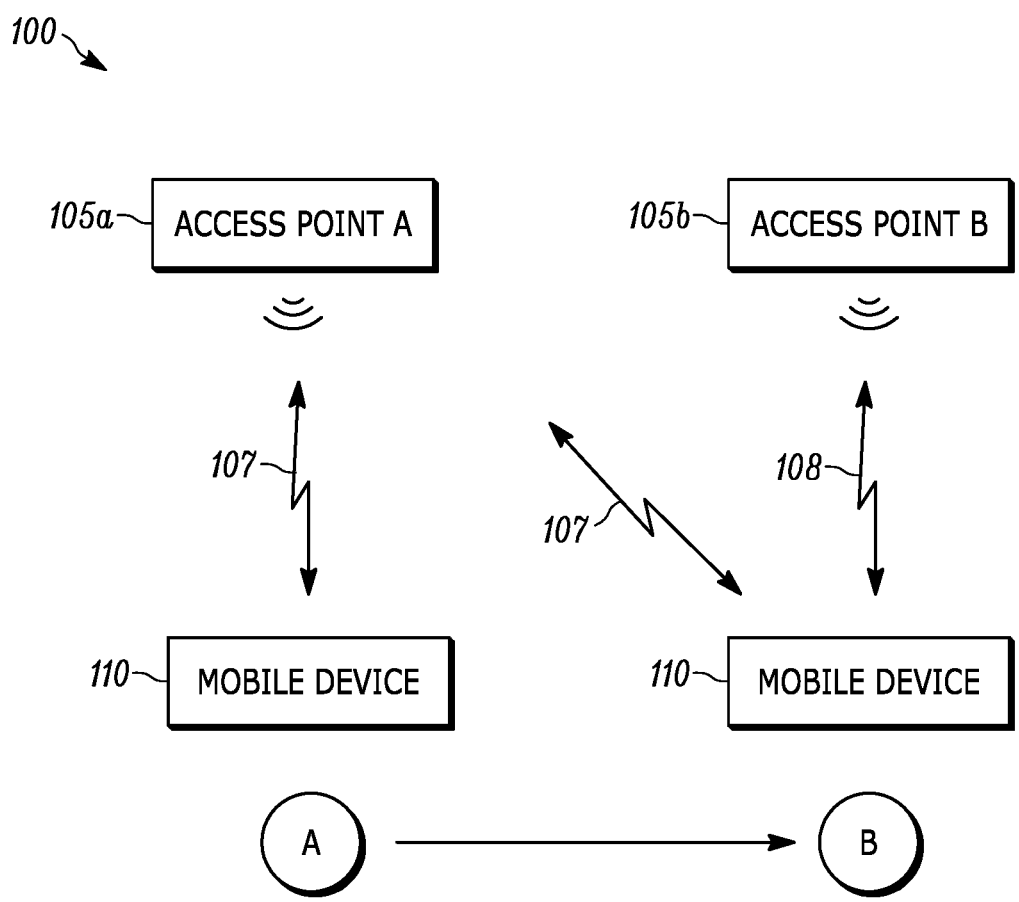
FIG. 1 illustrates an example scenario in which a mobile device is configured to perform a scan algorithm, in accordance with an example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the present disclosure include a method of dynamically adjusting a scan algorithm. The method includes obtaining, at an electronic device, a data packet of a communication session on a first communication channel. The method further includes analyzing, via one or more processors of the electronic device, the data packet to determine a priority level associated with the communication session and determining, via the one or more processors, that the priority level associated with the communication session exceeds a threshold priority level. In response to the determination, the method includes adjusting, via the one or more processors, one or more parameters of a scan algorithm implemented by a wireless driver when a signal quality for the first communication channel drops below a threshold quality level. The scan algorithm includes (i) an off-channel scan period during which the wireless driver analyzes a channel quality for one or more communication channels other than the first communication channel and (ii) an on-channel period for supporting the communication session on the first communication channel. The method further includes determining, via the one or more processors, that a signal quality for the first communication channel is below the threshold quality level and executing, via the one or more processors, the scan algorithm in accordance with the adjusted one or more parameters.

In some embodiments, determining the priority level associated with the communication session includes analyzing, via the one or more processors, one of a quality of service (QoS) parameter, a class of service (CoS) parameter, or a differentiated services code point (DSCP) parameter indicated by the data packet. Additionally or alternatively, determining the priority level associated with the communication session includes analyzing, via the one or more processors, a source of the data packet, wherein the source is one of an origination address or an origination port or analyzing, via the one or more processors, a tag associated with the data packet by the wireless driver.

In some embodiments, adjusting the one or more parameters of a scan algorithm includes reducing, via the one or more processors, a number of channels scanned during the off-channel scan period or at least one of a duration of the off-channel scan period or a maximum dwell time per channel scanned during the off-channel scan period. To implement the adjustment, adjusting the one or more parameters of a scan algorithm includes sending, via the one or more processors, an instruction in accordance with an application programming interface (API) of the wireless driver to adjust the one or more parameters or setting, via the one or more processors, a flag at the wireless driver to indicate that the electronic device is engaged in a prioritized communication session.

In some embodiments, the first communication channel is Wi-Fi communication channel. In these embodiments, the scan algorithm implemented by the wireless driver includes a first portion associated with scanning dynamic frequency selection (DFS) channels and a second portion associated with scanning non-DFS channels. Accordingly, in these embodiments, adjusting the one or more parameters of a scan algorithm includes adjusting, via the one or more processors, a first one or more parameters that correspond to the first portion of the scanning algorithm to a first set of values and adjusting, via the one or more processors, a second one or more parameters that correspond to the second portion of the scanning algorithm to a second set of values.

According to certain aspects, the adjusted scan parameters are non-optimal for lower priority communication sessions that are less sensitive to communication delays and jitter. For example, due the adjustments, the wireless driver may take longer to scan all available channels to determine which channel the wireless driver should hand over onto. Accordingly, in some embodiments, the method further includes detecting, via the one or more processors, that the communication session has terminated and reverting, via the one or more processors, the one or more parameters of the scan algorithm back to respective unadjusted values.

FIG. 1 illustrates an example scenario in which a mobile device 110 is configured to perform a scan algorithm, in accordance with an example. The mobile device 110 is located within a wireless communication network 100 that includes multiple access points 105, such as access point A 105a and access point B 105b. The access points 105 may be configured to broadcast signals using any known wireless communication protocol, including IEEE 802.11 protocols. To avoid cross-interference, access points 105a and 105b are typically configured to use non-overlapping channels. That is, the frequencies associated with the broadcast signals of the access point 105a typically do not overlap with the frequencies associated with the broadcast signals of the access point 105b.

Figure 2:
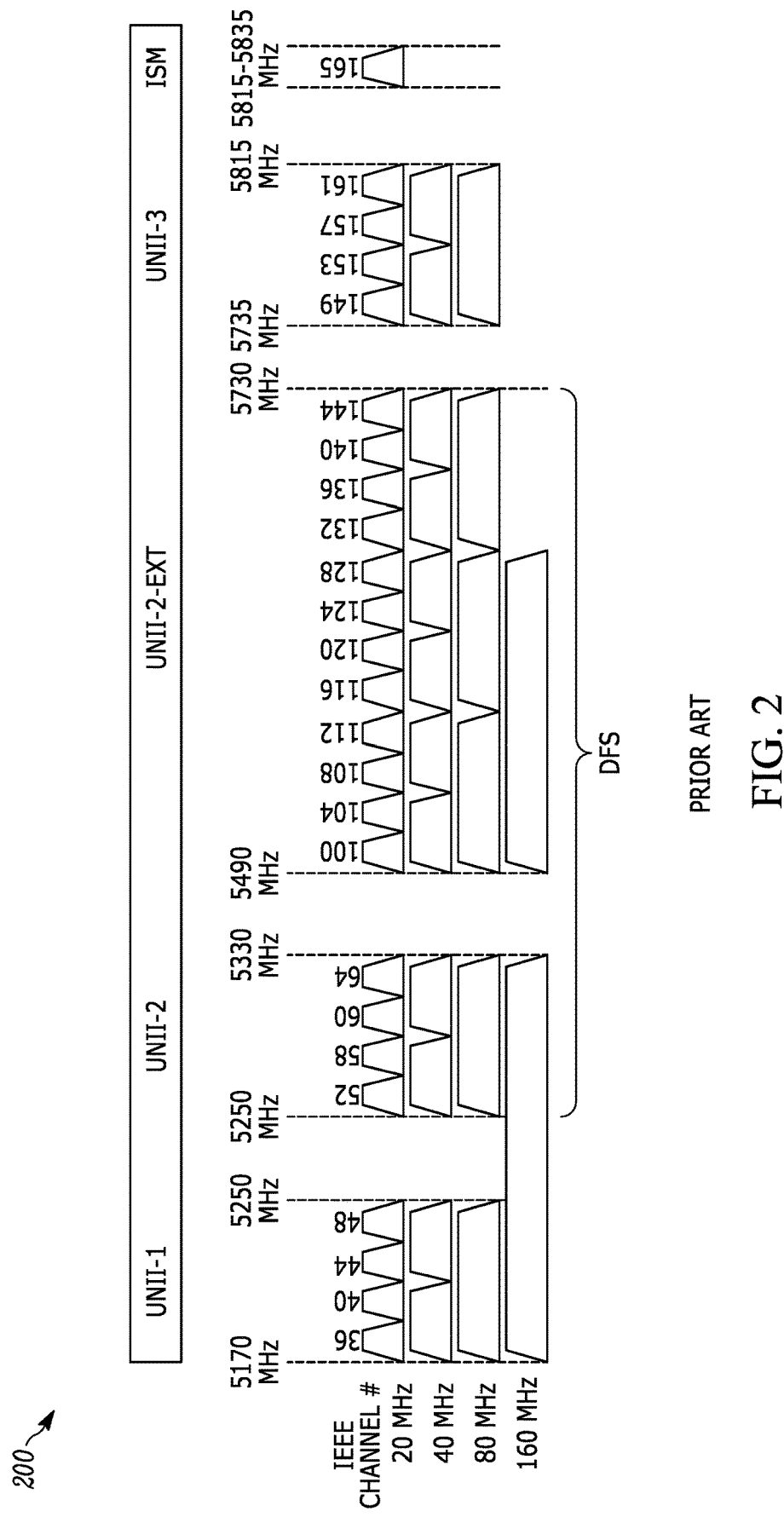
FIG. 2 is a chart depicting the available Wi-Fi channels in the 5 GHz band.

With concurrent reference to FIG. 2, illustrated is a chart of Wi-Fi channels 200 available for use at Wi-Fi networks that operate at the unlicensed 5 GHz band. As illustrated, the channels width may vary from 20 Mhz to 160 Mhz depending on the particular implementation of the communication network 100. The UNII-1 and UNII-3 blocks of channels are typically available for use in conventional Wi-Fi networks. On the other hand, the UNII-2 and UNII-2-Ext channels are typically used when the Wi-Fi network implements dynamic frequency selection (DFS) techniques. Unlike the other available channels, the DFS channels are required to be disabled when a radar signal, such as weather radar, is detected. Due to the need to detect radar signals, scanning DFS channels typically takes longer to scan than the other 5 GHz Wi-Fi channels.

In one example of implementing non-overlapping channels, the access point 105a broadcasts signals over channel 36 and the access point 105b broadcasts signals over channel 44. It should be appreciated that this is merely one example of how the communication network 100 is implemented such that adjacent access points 105a and 105b communicate over non-overlapping channels. Any known combination of non-overlapping channels may be implemented at the access points 105. Additionally, while FIG. 2 provides a channel chart for the unlicensed 5 GHz band, the communication network 100 may be configured to operate using alternative frequency bands and/or communication protocols. For example, the communication network 100 may be configured to operate at the unlicensed 2.4 GHz band or using 3GPP standards such as long term evolution (LTE) or New Radio (NR).

As illustrated in FIG. 1, the mobile device 110 is configured to support the same communication protocols as the access points 105. Accordingly, the mobile device 110 and the access point 105a are configure to communicate with one another over a first communication channel 107. In some scenarios, the mobile device 110 is engaged in a communication session with an external party over the first communication channel 107. In one example, the communication session is a VOIP session or a video conference session with a communication device located in another communication network. In another example, the communication session is a streaming video session with a content server. In still another example, the communication session is an emergency call with a public safety access point (PSAP).

When the mobile device 110 is located near the access point 105a, such as at location A, the communication channel 107 is above a threshold quality level. However, when the mobile device 110 is moved to a location further away from the access point 105a, the quality of the communication channel 107 is degraded. In some scenarios, the quality of the channel 107 may degrade beyond a threshold quality level to trigger the mobile device 110 to scan nearby communication channels, such as the communication channel 108 associated with the access point 105b.

In some embodiments, the quality level is determined based on a single quality parameter, such as one of a receive power, a transmit power, a received signal strength indication (RSSI), a signal to noise ratio (SNR), or a carrier to noise ratio (CNR). In other embodiments, the quality level is determined based upon a composite score that utilizes one or more of the individual quality parameters.

When the mobile device 110 is scanning for new channels, the mobile device 110 does not transmit or receive any data packets over the communication channel 107. As a result, the communication session may exhibit degraded performance, such as experiencing silent periods or choppy audio, switching to a lower-quality modulation scheme, or the generation of audio or visual artifacts. Accordingly, as described herein, if the communication session on the communication channel 107 is above a threshold priority, the mobile device 110 is configured to adjust the scan algorithm to prevent or mitigate the degraded performance.

Figure 3:
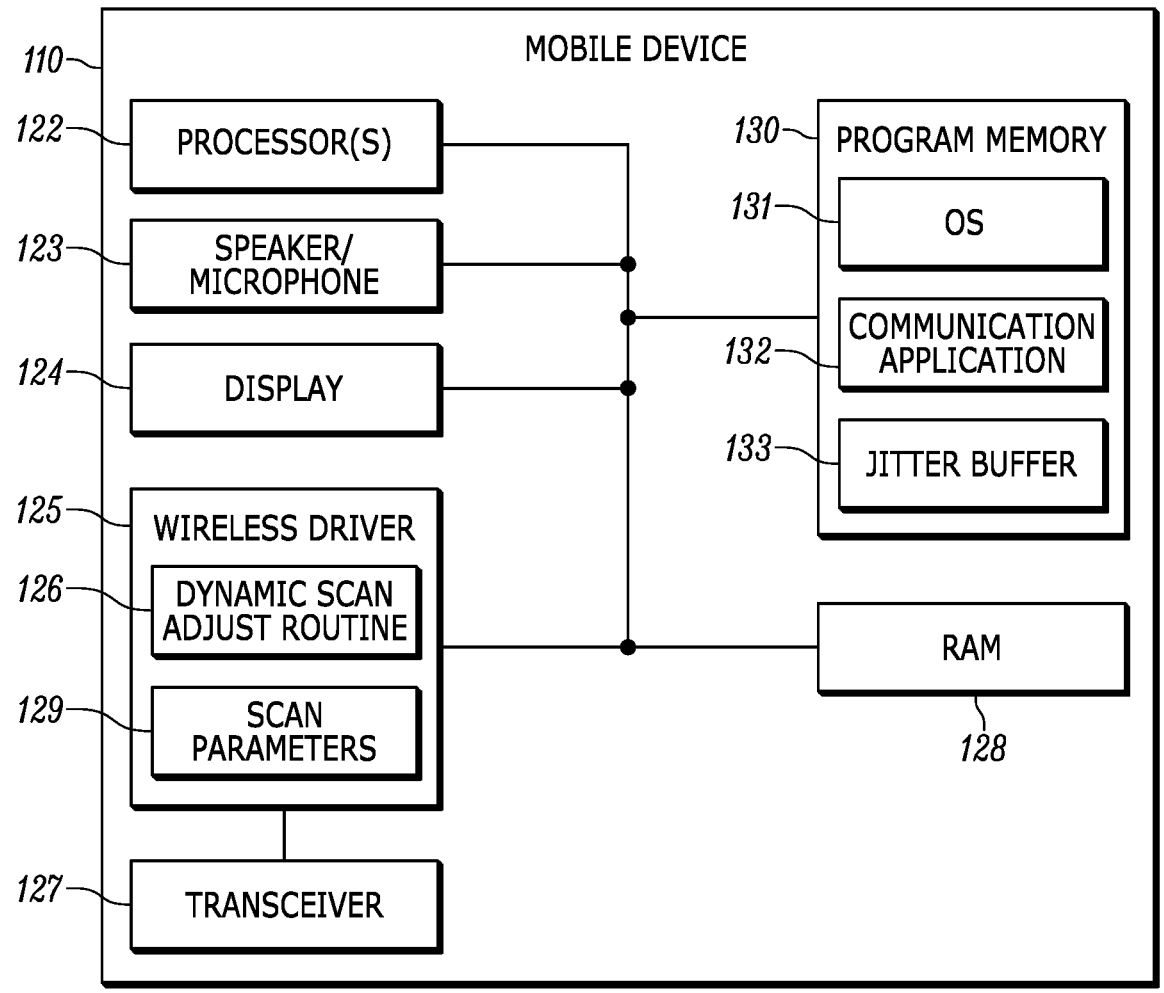
FIG. 3 is a block diagram representative of an embodiment of a mobile device of FIG. 1.

Turning now to FIG. 3, illustrated is a block diagram representative of an embodiment of mobile device 110 of FIG. 1. The example mobile device of FIG. 3 includes processor(s) 122, such as, for example, one or more microprocessors, controllers, and/or any suitable type of processor. The example mobile device of FIG. 3 further includes a program memory (e.g., volatile memory or non-volatile memory) 130 and a random-access memory (RAM) 128 that are accessible by the processor(s) 122, for example, via a memory controller (not shown). The example processor(s) 122 interacts with the program memory 130 to obtain, for example, machine-readable instructions stored in the memory 130 corresponding to, for example, the operations represented by the flowcharts of this disclosure. As another example the machine-readable instructions include an operating system 131 (e.g., Android, iOS, or Windows) of the electronic device 110 as well as a communication application 132 configured to initiate a communication session with a remote device. Additionally or alternatively, machine-readable instructions corresponding to the example operations of the block diagrams or flowcharts may be stored at a device driver, such as a wireless driver 125, on one or more removable media (e.g., a compact disc, a digital versatile disc, removable flash memory, etc.), or over a remote connection, such as the Internet or a cloud-based connection, that may be coupled to the mobile device 110 to provide access to the machine-readable instructions stored thereon. In one embodiment, the wireless driver 125 includes scanning processor circuitry, such as a specifically configured FPGA or ASIC circuit that implements the scan algorithm discussed herein (e.g., via a logic gate circuitry arrangement). In such an embodiment, the scanning processor of the wireless driver 125 executes the scan algorithm with enhanced processing speed that allows it to scan additional channels during the off-channel scan period, while maintaining the quality of the prioritized communication session.

The example mobile device of FIG. 3 includes input/output (I/O) interfaces such as a display 124 and a speaker/microphone 123 to enable receipt of user input and communication of output data to the user.

The example mobile device 110 of FIG. 3 further includes a wireless driver 125 that controls operation of a transceiver 127. The wireless driver 125 is configured to enable communication with one or more computer networks, such the communication network 100. The example transceiver 127 may be tunable by the wireless driver 125 to operate at any suitable frequency and in accordance with any suitable protocol(s), e.g., IEEE 802.11 or 3GPP standards.

Generally, when the mobile device 110 receives data packets as part of a communication session, the varying network conditions cause the data packets to not arrive at precisely the same interval. Accordingly, in order to smooth packet flow to a steady rate, the communication application 132 includes a jitter buffer 133 to which the data packets included in the communication session are routed. The jitter buffer 133 releases the data packets to the communication application 132 at a regular interval to produce a higher quality connection. It should be appreciated that the size of the jitter buffer 133 may vary depending on the particular type of communication session supported by the communication application 132.

When the mobile device 110 detects that the communication channel on which a communication session is routed drops below a threshold quality level, the wireless driver 125 is configured to execute a scan algorithm to identify a new channel on which to route the communication session. The wireless driver 125 is configured to execute the scan algorithm in accordance with one or more scan parameters 129. In some embodiments, one of the scan parameters 129 is a flag that indicates whether or not the mobile device 110 is engaged in a communication session above a threshold priority. In these embodiments, if the flag indicates that a prioritized communication session is active, the wireless driver 125 executes the scan algorithm in accordance with a first set of the scan parameters 129. On the other hand, if the flag indicates that a prioritized communication session is not active, the wireless driver 125 executes the scan algorithm in accordance with a second set of the scan parameters 129. In other embodiments, the scan parameters 129 include only a single set of scan parameters that are modified in response to detecting the initiation and termination of a prioritized communication session.

To determine whether the scan parameters should be adjusted, the wireless driver 125 includes a set of machine-executable instructions that comprise a dynamic scan adjust routine 126 configured to determine whether or not the mobile device 110 is engaged in a prioritized communication session and to set the scan parameters 129 accordingly. It should be appreciated that in alternate embodiments, some or all of the machine-executable instructions of the dynamic scan adjust routine 126 are included as part of an application stored at the program memory 130. In these embodiments, the dynamic scan adjust routine 126 transmits an instruction to the wireless driver 125 to adjust the scan parameters 129. The instruction is formatted in accordance with an application programming interface (API) of the wireless driver 126.

Figure 4A:
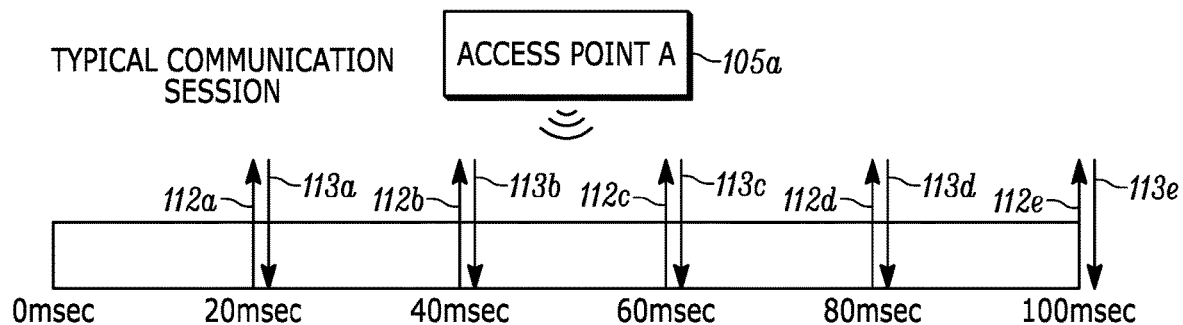
FIG. 4A illustrates example operation of a wireless driver during a typical communication session, such as when a mobile device is located at location A of FIG. 1.

Turning now to FIG. 4A, illustrated is example operation of the wireless driver 125 of the mobile device 110 during a typical communication session, such as when the mobile device 110 is located at location A of FIG. 1. As illustrated, the mobile device 110 is transmitting data packets 112 to the access point 105*a* and receiving data packets 113 from the access point 105*a* at about 20 millisecond intervals. Throughout the illustrated time period, the wireless driver 125 communicates over the communication channel 107. It should be appreciated that the illustrated received data packets 113 may indicate the time at which the data packet 113 is received from the jitter buffer 133 and not the time at which the data packet 113 is received from the access point 105*a*.

Figure 4B:
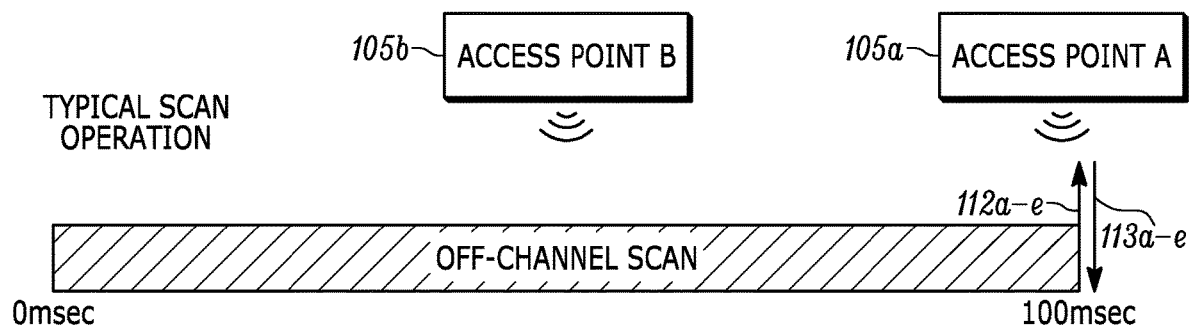
FIG. 4B illustrates example operation of a wireless driver during execution of a typical scan algorithm, such as when a mobile device is located at location B of FIG. 1.

However, when the mobile device 110 moves to location B of FIG. 1, the mobile device 110 initiates a scan algorithm. FIG. 4B illustrates example operation of the wireless driver 125 during execution of a typical scan algorithm, such as a scan algorithm of the wireless driver 125 that was not adjusted due to the presence of an active prioritized communication session. As illustrated, for the entire 100 millisecond interval, the wireless driver 125 has configured the transceiver 127 to be tuned to channels other than the communication channel 107 supported by access point 105*a* (e.g., "off-channels"). For example, the wireless driver 125 may be configured to tune the transceiver 127 to each of the off-channels within the UNII-1 and/or UNII-3 blocks, or each of the off-channel DFS channels within the UNII-2 and/or UNII-2-EXT blocks. As illustrated, at least one of the off-channels, such as the communication channel 108, is supported by the access point 105*b*.

While the wireless driver 125 is tuned to the various off-channels, the mobile device 110 cannot transmit data packets 112 to the access point 105*a* over the communication channel 107, nor can the mobile device 110 receive data packets 113 from the access point 105*a* over the communication channel 107. When the off-channel scan period expires, the mobile device 110 is configured to transmit any queued data packet 112 that the mobile device 110 was unable to transmit during the off-channel scan period. Similarly, the mobile device 110 also begins to receive any data packets 113 that the mobile device 110 failed to receive during the off-channel scan period. In some embodiments, the previously un-received data packets are received out of order due to varying retry timers associated with each un-received data packet 113. In these embodiments, the jitter buffer 133 may reorder the data packets 113 after reception to preserve communication session quality. This reordering introduces additional delays after the wireless driver 125 retunes the transceiver 127 to communicate over the communication channel 107.

However, when the off-scan period exceeds the duration of the data packets in the jitter buffer 133, the communication session has no data to present. For ordinary communication sessions, such as those associated with general internet access, the 100 millisecond delay is not perceptible to the end user. Because the wireless driver 125 is capable of scanning more channels during a longer off-channel scan period, in these scenarios the number of off-channel scan periods required to scan the complete list of off-channels is reduced. On the other hand, if the communication session is a prioritized communication session, the delay is unacceptable to the user experience. For example, if the communication session is a voice call, the call will experience periods of silence causing the audio to sound choppy. The longer the wireless driver 125 is configured to scan off-channels, the longer the periods of silence.

Instead, embodiments described herein adjust the typical scan operation for prioritized communication sessions to reduce the packet delay during the off-channel scan period.

Figure 4C:
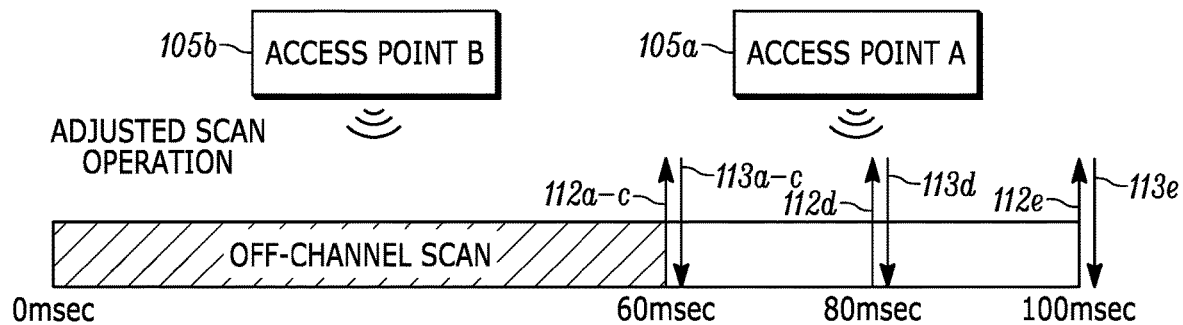
FIG. 4C illustrates example operation of a wireless driver during execution of an adjusted scan algorithm in accordance with an example embodiment.

FIG. 4C illustrates example operation of the wireless driver 125 during execution of an adjusted scan algorithm in accordance with an example embodiment. As illustrated, the adjusted off-channel scan period is 60 milliseconds instead of the original 100 milliseconds. Thus, only two data packets 112, 113 are missed during the off-channel scan period, instead of the four data packets 112, 113 during the typical scan algorithm. As a result, the performance degradation due to delay in reception and/or introduced by the jitter buffer 133 is mitigated.

It should be appreciated that FIGS. 4A-C illustrate one example scenario and that the illustrated timing may vary depending on the particular communication session. For example, other communication sessions may be configured to transmit or receive data packets every 10 milliseconds or every 30 milliseconds. As another example, other implementations may permit an off-channel scan period of 200 milliseconds. Accordingly, the amount by which the adjusted scan algorithm reduces the off-channel scan period may be determined based upon the particular packet interval and/or default off-channel scan period for the particular communication session and/or communication network.

Figure 5:
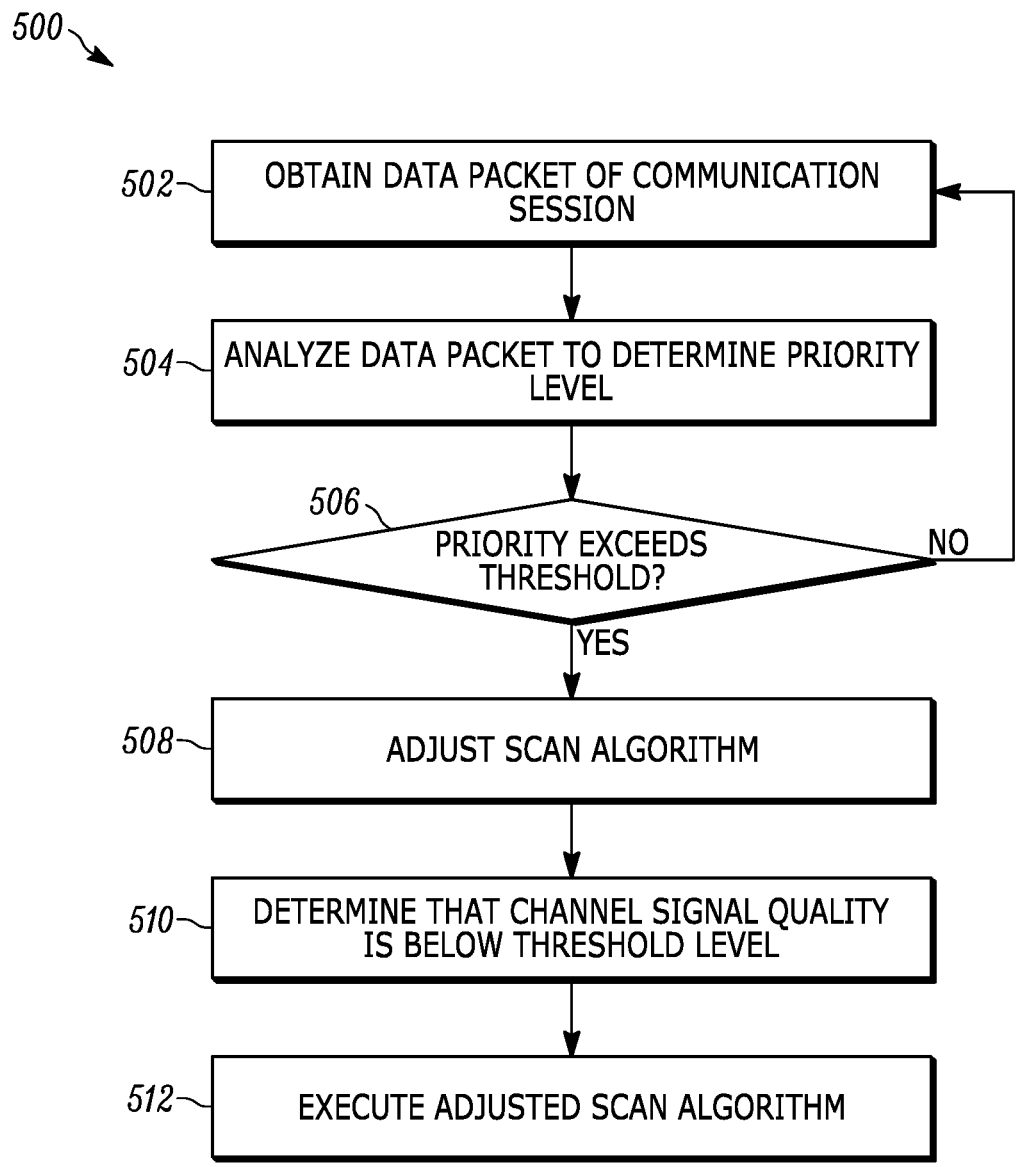
FIG. 5 is a flow chart of a method for dynamically adjusting a scan algorithm, in accordance with an example embodiment.

FIG. 5 is a flow chart of a method 500 for dynamically adjusted a scan pattern, in accordance with an example embodiment. As described herein, the method 500 may be performed by a dynamic scan adjust routine 126 implemented at a wireless driver 125 and/or a program memory 130 of a mobile device 110. The method 500 may begin at block 502 when the wireless driver 125 obtains a data packet as part of a communication session. More particularly, the wireless driver 125 obtains data packets received by the transceiver 127 of the mobile device 110.

At block 504, the wireless driver 125 analyzes the data packet to determine a priority level of the communication session. In some embodiments, the data packet header includes information indicative of the data packet priority. For example, some implementations of the communication network 100 support quality of service (QoS) indicators. As one example, IEEE 802.1p supports a class of service (CoS) parameter. As another example, other IP protocols implement differentiated services code point (DSCP) indicators. It will be appreciated that other protocols that indicate a packet priority in the data packet header are also envisioned. Accordingly, in these embodiments, the wireless driver determines the data packet priority based on the particular QoS parameter(s) included in the packet header.

In other embodiments, the wireless driver 125 analyzes a port or origination address included in the packet header to determine the priority level for the data packet. In one example, the communication application 132 is configured to communicate with a particular known server (e.g., a VOW application is configured to communicate with a VOIP server). Similarly, some communication applications 132 are configured to communicate over specific ports on the communication network. Accordingly, by maintaining a list of IP addresses and/or ports known to be associated with various types of communication services, the wireless driver 125 is able to appropriately prioritize the communication session based on the origination information included in the data packet header.

In additional or alternative embodiments, the wireless driver 125 performs packet inspection techniques to determine the type of communication session. In these embodiments, the wireless driver 125 may analyze a series of data packets of the communication session to identify the communication service supported by the communication session. For example, data packets the form a particular communication services may exhibit a known packet interval and/or have an expected packet size. By identifying these packet characteristics, the wireless driver 125 is able to identify a communication session as a particular type of communication service even if the packet header does not provide sufficient information. Once the wireless driver 125 determines the particular communication service, the wireless driver can then assign the data packets the appropriate priority. To prevent the need to continue perform the packet inspection techniques, the wireless driver 125 may apply a tag to future data packets within the communication session to such that they are readily prioritized in accordance with the particular communication service.

At decision 506, the wireless driver 125 compares the priority of the communication session to a threshold priority. For example, the threshold may be set such that emergency call sessions, VOW sessions, and streaming media sessions exceed the threshold and ordinary internet use does not exceed the threshold. In some implementations, the priority is a number, such as a number between 1 and 10. In other implementations, the priority is a flag or a string, such as "high" or "normal". Accordingly, the particular threshold is chosen to comply with the particular prioritization scheme of the particular implementation.

If the priority does not exceed the threshold ("NO"), then the wireless driver 125 returns to block 502 where it obtains data packets associated with another communication session. On the other hand, if the priority does exceed the threshold ("YES"), the wireless driver 125 proceeds to block 508 where the wireless driver 125 adjusts a scan algorithm executed by the wireless driver 125. More particularly, the wireless driver 125 adjusts the scan algorithm to reduce the amount of time the transceiver 127 is not tuned to the active channel. In some embodiments, the reduction is achieved by lowering a scan algorithm parameter that sets the maximum off-channel scan period (e.g., a Scan_home_away_time parameter) or a maximum dwell time the wireless driver 125 spends scanning each individual channel during the off-channel scan period (e.g., a per_channel_MAX_dwell_time parameter).

In some implementations, the wireless driver 125 maintains multiple sets of scan parameters. In one example, the wireless driver 125 maintains a first set of scan parameters to utilize in normal communication sessions and a second set of scan parameters to utilize in prioritized communication sessions. In this example, the wireless driver 125 sets a flag to indicate whether the mobile device 110 is engaged in a prioritized communication session. Accordingly, when the wireless driver 125 detects the need to perform an off-channel scan, the wireless driver 125 accesses the appropriate set of scan parameters. In another example, the wireless driver 125 maintains a single set of scan parameters that are modified in response to the wireless driver 125 determining that the communication session exceeds the threshold priority.

In embodiments where the wireless driver 125 is connected to a Wi-Fi channel, the scan algorithm may include a first set of parameters for scanning normal Wi-Fi channels (e.g., UNII-1 and UNII-3 channels) and a second set of parameters for scanning DFS Wi-Fi channels (e.g., UNII-2 and UNII-2-EXT channels). For example, the channel dwell time for normal Wi-Fi channels may be 20 milliseconds and a maximum off-channel scan time of 200 milliseconds and the channel dwell time for DFS Wi-Fi channels may be 100 milliseconds and a maximum off-channel scan time of 200 milliseconds. It should be appreciated in these embodiments, the wireless driver 125 adjusts both the scan parameters for the normal Wi-Fi channels and the DFS Wi-Fi channels (e.g., the wireless driver 125 sets the maximum off-channel scan time for the normal Wi-Fi channels to 40 milliseconds and the maximum off-channel scan time for the DFS Wi-Fi channels to 100 milliseconds).

At block 510, the wireless driver 125 determines that a channel signal quality for the active channel is below a scan threshold value. As a result, the wireless driver 125 is configured to scan the environment to any candidate channels onto which the wireless driver 125 can handover. Accordingly, at block 512, the wireless driver 125 executes the adjusted scan algorithm. In embodiments that utilize a priority flag, the wireless driver 125 analyzes the priority flag to identify the set of scan parameters to utilize when engaged in prioritized communication sessions.

In some embodiments, the method 500 also includes the wireless driver 125 determining that the prioritized communication session 125 has terminated. For example, the wireless driver 125 may detect a termination code included in a data packet transmitted as part of the communication session. In response, the wireless driver 125 is configured to revert the scan algorithm back to the normal parameter values. In some embodiments, reversion includes setting the priority flag back to a normal level. In other embodiment, reversion includes setting the parameters back to the original values.

It will be appreciated that while the above describes actions as being performed by the wireless driver 125, in other embodiments other components of the mobile device 110 may be configured to perform any of the actions described above. For example, the program memory 130 may store an application to interact with the wireless driver 125 that acts in coordination with the wireless driver 125 to perform the various actions associated with the method 500.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U. S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of dynamically adjusting a scan algorithm, the method comprising:
   obtaining, at an electronic device, a data packet of a communication session on a first communication channel;
   analyzing, via one or more processors of the electronic device, the data packet to determine a priority level associated with the communication session;
   determining, via the one or more processors, that the priority level associated with the communication session exceeds a threshold priority level;
   in response to the determination of the priority level, adjusting, via the one or more processors, one or more parameters of the scan algorithm when a signal quality for a first communication channel drops below a threshold quality level, wherein the scan algorithm includes (i) an off-channel scan period during which the electronic device analyzes a channel quality for one or more communication channels other than the first communication channel, and (ii) an on-channel period for supporting the communication session on the first communication channel;
   determining, via the one or more processors, that a signal quality for the first communication channel is below the threshold quality level; and
   executing, via the one or more processors, the scan algorithm in accordance with the adjusted one or more parameters.

2. The method of claim 1, wherein determining the priority level associated with the communication session comprises:
   analyzing, via the one or more processors, one of a quality of service (QoS) parameter, a class of service (CoS) parameter, or a differentiated services code point (DSCP) parameter indicated by the data packet.

3. The method of claim 1, wherein determining the priority level associated with the communication session comprises:
   analyzing, via the one or more processors, a source of the data packet, wherein the source is one of an origination address or an origination port.

4. The method of claim 1, wherein determining the priority level associated with the communication session comprises:
   analyzing, via the one or more processors, a tag associated with the data packet by the electronic device.

5. The method of claim 1, wherein determining that the priority level associated with the communication session exceeds the threshold priority level comprises:
   determining, via the one or more processors, that the communication session is one of a voice over internet protocol (VOIP) communication session or a streaming video communication session.

6. The method of claim 1, wherein adjusting the one or more parameters of the scan algorithm comprises:
   reducing, via the one or more processors, a number of channels scanned during the off-channel scan period.

7. The method of claim 1, wherein adjusting the one or more parameters of the scan algorithm comprises:
   reducing, via the one or more processors, at least one of a duration of the off-channel scan period or a maximum dwell time per channel scanned during the off-channel scan period.

8. The method of claim 1, wherein adjusting the one or more parameters of the scan algorithm comprises:
   sending, via the one or more processors, an instruction in accordance with an application programming interface (API) of a wireless driver of the electronic device to adjust the one or more parameters.

9. The method of claim 1, further comprising:
   detecting, via the one or more processors, that the communication session has terminated; and
   reverting, via the one or more processors, the one or more parameters of the scan algorithm back to respective unadjusted values.

10. The method of claim 1, wherein:
    the first communication channel is Wi-Fi communication channel, and
    the scan algorithm includes a first portion associated with scanning dynamic frequency selection (DFS) channels and a second portion associated with scanning non-DFS channels.

11. The method of claim 10, wherein adjusting the one or more parameters of the scan algorithm comprises:
    adjusting, via the one or more processors, a first one or more parameters that correspond to the first portion of the scanning algorithm to a first set of values; and
    adjusting, via the one or more processors, a second one or more parameters that correspond to the second portion of the scanning algorithm to a second set of values.

12. The method of claim 1, wherein adjusting the one or more parameters of the scan algorithm comprises:
    setting, via the one or more processors, a flag at the wireless driver to indicate that the electronic device is engaged in a prioritized communication session.

13. An electronic device comprising:
    a transceiver configured to be tuned to a first channel during a communication session;
    a scanning processor operatively connected to the transceiver and configured to implement a scan algorithm when a channel quality for the first channel drops below a threshold quality level, the scan algorithm including (i) an off-channel scan period during which the electronic device tunes the transceiver to detect a channel quality for one or more communication channels other than the first channel, and (ii) an on-channel period during which the wireless driver tunes the transceiver to the first channel, wherein the scanning processor is configured to:
    obtain a data packet associated with the communication session and received by the transceiver;
    analyze the data packet to determine a priority level associated with the communication session;
    determine that the priority level associated with the communication session exceeds a threshold priority level;
    in response to the determination, adjust one or more parameters of the scan algorithm;
    determine that a signal quality for the first channel is below the threshold quality level; and
    execute the scan algorithm in accordance with the adjusted one or more parameters.

14. The electronic device of claim 13, wherein to determine the priority level associated with the communication session, the scanning processor is further configured to:
    analyze one of a quality of service (QoS) parameter, a class of service (CoS) parameter, or a differentiated services code point (DSCP) parameter indicated by the data packet.

15. The electronic device of claim 13, wherein to determine the priority level associated with the communication session, the scanning processor is further configured to:
analyze a source of the data packet, wherein the source is one of an origination address or an origination port.

16. The electronic device of claim 13, wherein to determine the priority level associated with the communication session, the scanning processor is further configured to:
analyze a tag associated with the data packet.

17. The electronic device of claim 13, wherein to adjust the one or more parameters of the scan algorithm, the scanning processor is further configured to:
reduce a number of channels scanned during the off-channel scan period.

18. The electronic device of claim 13, wherein to adjust the one or more parameters of the scan algorithm, the scanning processor is further configured to:
reduce at least one of a duration of the off-channel scan period or a maximum dwell time per channel scanned during the off-channel scan period.

19. The electronic device of claim 13, wherein to adjust the one or more parameters of the scan algorithm, the scanning processor is further configured to:
send an instruction in accordance with an application programming interface (API) a the wireless driver of the electronic device to adjust the one or more parameters.

20. The electronic device of claim 13, wherein the scanning processor is further configured to:
detect that the communication session has terminated; and
revert the one or more parameters of the scan algorithm back to respective unadjusted values.

21. The electronic device of claim 13, wherein:
the first communication channel is Wi-Fi communication channel, and
the scan algorithm implemented includes a first portion associated with scanning dynamic frequency selection (DFS) channels and a second portion associated with scanning non-DFS channels.

22. The electronic device of claim 21, wherein the scanning processor is further configured to:
adjust a first one or more parameters that correspond to the first portion of the scanning algorithm to a first set of values; and
adjust a second one or more parameters that correspond to the second portion of the scanning algorithm to a second set of values.

23. The electronic device 13, wherein to adjust the one or more parameters of the scan algorithm, the scanning processor is further configured to:
set a flag to indicate that the electronic device is engaged in a prioritized communication session.

* * * * *